(12) United States Patent
Lee

(10) Patent No.: US 7,788,689 B2
(45) Date of Patent: Aug. 31, 2010

(54) METHOD OF RECORDING BROADCASTING PROGRAM BASED ON RATINGS

(75) Inventor: Kyu Sang Lee, Seoul (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 502 days.

(21) Appl. No.: 11/429,971

(22) Filed: May 9, 2006

(65) Prior Publication Data
US 2007/0055981 A1 Mar. 8, 2007

(30) Foreign Application Priority Data
Sep. 5, 2005 (KR) ...................... 10-2005-0082242

(51) Int. Cl.
*G06F 3/00* (2006.01)
(52) U.S. Cl. ...................................................... 725/46
(58) Field of Classification Search .................... 725/46
See application file for complete search history.

(56) References Cited

U.S. PATENT DOCUMENTS

| | | | |
|---|---|---|---|
| 4,914,714 A | | 4/1990 | Tamura |
| 6,144,401 A | * | 11/2000 | Casement et al. ............. 725/30 |
| 6,357,043 B1 | * | 3/2002 | Ellis et al. ...................... 725/61 |
| 6,529,526 B1 | * | 3/2003 | Schneidewend ............. 370/486 |
| 2002/0046404 A1 | * | 4/2002 | Mizutani ....................... 725/58 |
| 2002/0144270 A1 | * | 10/2002 | Mizushiro et al. .............. 725/55 |
| 2003/0014750 A1 | * | 1/2003 | Kamen .......................... 725/25 |
| 2004/0244030 A1 | * | 12/2004 | Boyce et al. ................... 725/25 |

FOREIGN PATENT DOCUMENTS

| | | |
|---|---|---|
| KR | 10-41138 | 4/1991 |
| KR | 2000-28270 | 5/2000 |
| KR | 2000-34733 | 6/2000 |

OTHER PUBLICATIONS

Search Report issued by Korean Intellectual Property Office, search conducted from Jun. 16-Jun. 21, 2005.

* cited by examiner

*Primary Examiner*—Brain T Pendleton
*Assistant Examiner*—Cai Chen
(74) *Attorney, Agent, or Firm*—Stanzione & Kim LLP

(57) ABSTRACT

A method of recording a broadcasted programs based on ratings is disclosed. The method includes setting a watching restriction rating of the broadcasted program according to user commands, detecting rating restriction information in a broadcasted signal, associated with the broadcasted program, received when the broadcasted program is recorded, and comparing the detected rating restriction information with the set watching restriction rating, and automatically setting a password to be associated with the recording of the broadcasted program when the detected rate restriction information is higher than the set watching restriction rating.

30 Claims, 2 Drawing Sheets

METHOD OF RECORDING BROADCASTING PROGRAM BASED ON RATINGS

CROSS-REFERENCE TO RELATED APPLICATION

This application claims the benefit of Korean Application No. 2005-82242, filed Sep. 5, 2005, in the Korean Intellectual Property Office, the disclosure of which is incorporated herein by reference.

BACKGROUND OF THE INVENTION

1. Field of the Invention

An aspect of the present invention relates to a method of recording broadcasting based on ratings, and, more particularly, to a method of recording broadcasted programs based on rating in a DVD recorder, which is capable of determining ratings of presently received broadcasted programs, when a video signal recording/reproducing apparatus records the broadcasted programs, and automatically setting a password to a title of one of the programs, whose rating is over the restriction rating previously set by a user.

2. Description of the Related Art

Currently, with the development of broadcasted and communications, electronic technologies, televisions, computers and portable devices are generally used. For example, with respect to televisions, with the development of image technology and the movie industry, various genres of broadcasted programs have been developed such that users may easily watch the broadcasted programs. However, since adult programs, such as pornography and violent movies, etc., may not be generally restricted, juveniles may relatively easily access adult programs. Juvenile access to such programming may cause social problems.

Therefore, there is a demand for a system of restricting broadcasted programs so that the juveniles cannot easily access them. According to such a demand, it has been proposed that televisions with screen sizes of over 13 inches should have V-chips installed therein in the U.S.A. Concurrently, broadcasted signals should include rating restriction signals defining rating of broadcasted programs.

The V-chip, being installed in a television set, rectifies pornography and violent movies in currently received broadcasted programs. In more detail, pornography and violent movies broadcasted by broadcasted companies in the USA are classified into ratings of 0 to 5. Therefore, when a previously set rate is inputted in the V-chip of the television, broadcasted programs over the previously set rate cannot be received by the television, thereby preventing juveniles from watching inappropriate broadcasted programs.

Such V-chip operations are presently employed in broadcasted companies and televisions. However, they have not been adopted by apparatuses to record/reproduce broadcasted programs, such as video cassette tape recorders (VCRs) or digital video display (DVD) recorders, etc. Thus, while adult programs may be harmful to juveniles who watch them even once, the problems with these programs may be exacerbated when the programs are recorded for reproduction by VCRs and/or DVD recorders.

In order to resolve such problems, Korean Patent No. 10-41138 discloses that adult programs cannot be recorded without an input of a password. The method proposed in Korean Patent No. 10-41138 selects whether a V-chip recording prevention operation is used in a home apparatus to record/reproduce broadcasted programs. When the V-chip recording prevention operation is used, a password is inputted and stored in the V-chip such that non-adult programs may be normally recorded and such that adult programs cannot be recorded until the stored password is inputted therein.

However, the recording prevention method of the related art has disadvantages in that the apparatus to record/reproduce broadcasted programs must have the V-chip installed therein and a user must input a password each time when he/she records the adult program. Also, it has drawbacks in that, the password may be stolen, and that, when a user reserves a broadcasted program, the recording/reproducing apparatus may not record the broadcasted programs.

SUMMARY OF THE INVENTION

Therefore, an aspect of the invention provides a method of recording broadcasted programs based on ratings.

It is another aspect of the invention to provide a method of recording broadcasted programs based on ratings which is capable of detecting rating restriction signals of received broadcasted programs, and automatically setting a password to a title of one of the programs, whose rating is over the restriction rate previously set by a user.

In accordance with an aspect of the invention, there is provided a method of recording a broadcasted program, comprising setting a watching restriction rating of the broadcasted program according to user commands; detecting rating restriction information in a broadcasted signal, associated with the broadcasted program, received when the broadcasted program is recorded, and comparing the detected rating restriction information with the set watching restriction rating; and automatically setting a password to be associated with the recording of the broadcasted program when the detected rate restriction information is higher than the set watching restriction rating.

The method further comprises inputting the password for the already set watching restriction rating thereto according to the user's commands. The automatic setting of a password serves to set the password inputted by the user's commands, serves to automatically generate and set the password for the watching restriction rating set by a user, and/or serves to automatically set the password to a title of the broadcasted programs to be recorded such that the broadcasted programs cannot be accessed. The method may further comprise recording the broadcasted programs without an input of the password when the detected rating restriction information is lower than the set watching restriction rating. The method may further comprise determining as to whether the password, which is inputted by a user as the password, is needed when reproducing the recorded broadcasted programs, and whether the password is consistent with the set password. Here, when the inputted password is consistent with the set password, the recorded broadcasted programs are reproduced.

In accordance with another aspect of the invention, there is provided a method of recording a broadcasted program, comprising setting a watching restriction rating of the broadcasted program according to first user commands, inputting a password for the set watching restriction rating according to second user commands, detecting rate restriction information in a broadcasted signal received when the broadcasted program is recorded, and comparing the detected rate restriction information with the set watching restriction rating, and automatically setting the password to be associated with a recording of the broadcasted program when the detected rate restriction information is higher than the set watching restriction rating.

The automatic setting of a password serves to automatically set the password inputted by the user to a title of the broadcasted programs to be recorded such that the broadcasted programs cannot be accessed. The method may further comprise recording the broadcasted programs without input of the password when the detected rate restriction information is lower than the set watching restriction rating.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
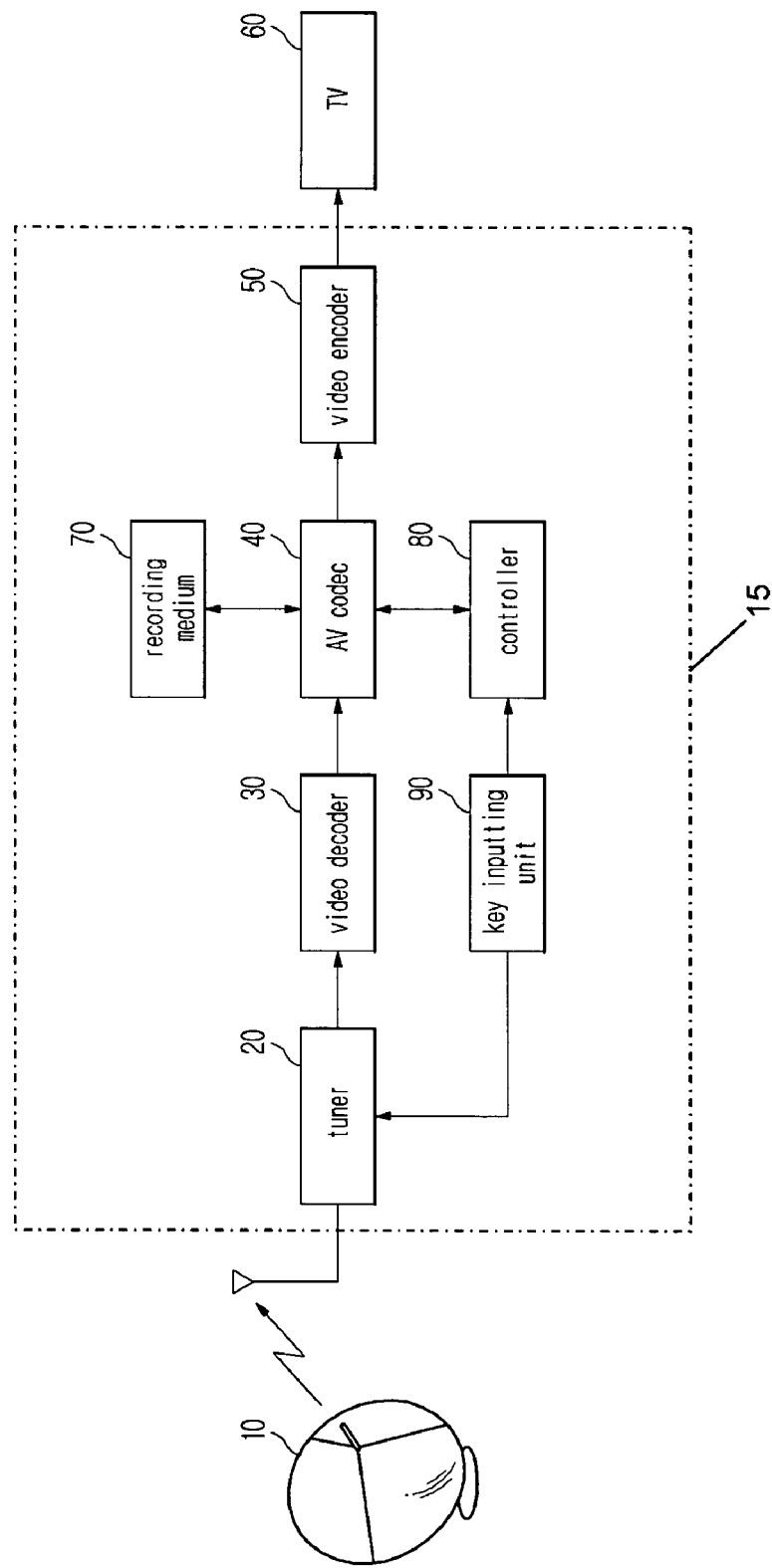
FIG. 1 is a block diagram of a DVD recorder.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a DVD recorder 15 according to the present invention. The DVD recorder records and reproduces video data and audio data in/from optical discs, such as DVDs, Hard Discs, or memory cards, etc., or combinations thereof.

A broadcasting company 10 transmits broadcasted signals in which rating restriction signals (or V-chip signals) classifying ratings of broadcasted programs are loaded to a DVD recorder. Here, rating information of broadcasted programs are indexed as follows:

Rating 0: all children may watch
Rating 1: children up age 7 may watch
Rating 2: all people may watch
Rating 3: children may watch with parent
Rating 4: children under age 14 may not watch
Rating 5: children under age 18 may not watch (minor may not watch)

As such, the DVD recorder 15, which receives and records the broadcasted signals including rating restriction information, includes a tuner 20 to receive a broadcasted program through a channel selected by a user, a video decoder 30, an A/V codec 40, a video encoder 50, a recording medium 70, a controller 80 and a key input unit 90.

The tuner 20 receives the broadcasted signals from an external source (for example, the broadcasting company 10) and outputs the received signals in a video and audio signal format. More specifically, when an antenna receives the broadcasted signals, the tuner 20 receives the broadcasted signals from the antenna through a channel to which the TV is tuned as a result of a user selection via the key input unit 90. Further, the tuner 20 demodulates the broadcasted signals to generate video and audio signals at a predetermined channel frequency, which are outputted to the video decoder 30 and an audio processor (not shown), respectively. The video decoder 30 receives the video signals from the tuner 20 and detects a rating restriction signal (a V-chip signal) in a video signal 284 line, such that the rating restriction signal may be transmitted to the A/V codec 40. The A/V codec 40 compresses and codes the inputted video and audio signals in an MPEG-2 format, and generates an A/V data bit stream or decodes compressed A/V data bit stream to video signals. The A/V codec 40 is operated such that, when the video signals inputted from the video decoder 30 include rating restriction information, a password is automatically set when the broadcasted program is recorded according to a user's input, and the broadcasted program is, thereafter, reproducible provided that the set password is inputted. The video encoder 50 converts the video signals decoded by the A/V codec 40 into TV signals and then outputs the TV signals to the TV 60, in which the output signals include the rating restriction signal. The recording medium 70 records the video signals compressed by the A/V codec 40, and may comprise a Hard Disc, a memory card, and/or a disc loader.

The controller 80 controls operations of the DVD recorder 15 according to user commands that are inputted through the key input unit 90. In order to restrict recording operations using the V-chip, the controller 90 stores the restriction ratings of broadcasted programs and passwords for the restriction ratings, which are set by the user, and transmits the stored password(s) to the A/V codec 40 such that the password(s) inputted by the user may be automatically set to a title of the broadcasted program when a recording of the broadcasted program is completed.

The key input unit 90 allows for an input of the user's commands associated with recording operations of broadcasting programs and with reproducing operations of broadcasted programs recorded in the recording medium 70. The key input unit 90 comprises a remote controller or keys installed in the DVD recorder 15. The key input unit 90 may comprise a plurality of key buttons through which a user may input commands. These commands may include recording operation settings using the V-chip, restriction rating settings according to the user's demands when setting up a recording operation using the V-chip, inputted passwords for restriction ratings which are set by the user, beginning/ending times of recording operations, and power on/off operations, etc.

Figure 2:
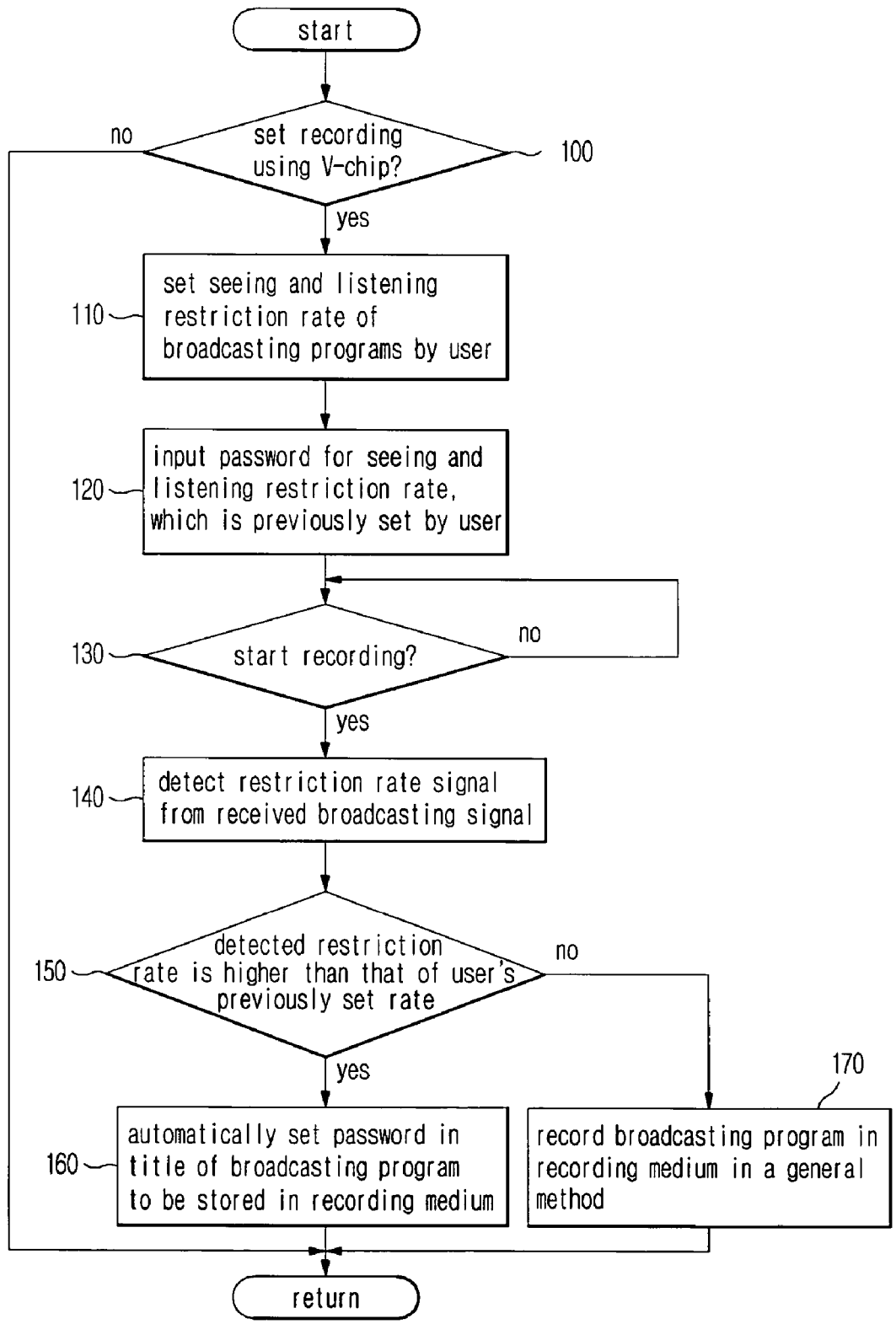
FIG. 2 is a flow chart for describing a method of recording broadcasted programs based on ratings.

A method of recording broadcasted programs in DVDs recorders, as described above, based on ratings, is described in detail below. FIG. 2 is a flow chart to describe an embodiment of the invention.

First, when a user sets up a recording operation using the V-chip through the key input unit 90, the controller 80 determines whether a key signal, which corresponds to the setting of the recording operation using the V-chip, is inputted thereto through the key input unit 90 in operation 100. When the recording setting signal using the V-chip is inputted, a menu to allow for a setting of watching restriction ratings is loaded on a display (for example, a TV monitor). After confirming the menu on the display, the user sets a watching restriction rating of the broadcasted program to be recorded in the DVD recorder in operation 110.

When the watching restriction rating of the broadcasted program to be recorded by the user is set, the watching restriction rating is stored in a memory of the controller 80. The controller 80 is programmed to require a password for the watching restriction rating.

When a password is inputted in operation 120, the password is stored in the memory of the controller 80, and, then, the controller 80 determines whether the recording operation starts in operation 130.

When the recording operation starts, the tuner 20 is controlled such that the broadcasted signals of the channel selected by the user may be received, the video decoder 30 receives the video signals of the broadcasted programs received through the tuner 20 and detects the rating restriction signal in the video signal 284 line to transmit the rating restriction signal to the A/V codec 40 in operation 140.

When the rating restriction information is included in the video signal inputted from the video decoder 30, the A/V codec 40 determines whether the detected rating restriction information is higher than that of the watching restriction rating stored in the controller 80, which, as noted above, is inputted by the user in operation 150.

When the detected rating restriction information is higher than the watching restriction rating that is set by the user, the password that was previously inputted by the user is automatically set to a title of the broadcasted program when the broadcasted program is recorded in the recording medium 70 in operation 160. Afterwards, the broadcasted programs recorded in the recording medium 70 are reproduced only provided that the password is inputted by a user.

On the other hand, if the detected rating restriction information is lower than the watching restriction rating set by the user, the broadcasted program is recorded in the recording medium 70 without a password, or in a general recording fashion, in operation 170. Afterward, such a program, having been recorded in the recording medium 70, may be reproduced without an input of any password.

As such, although the above described embodiment is implemented such that a password for watching restriction ratings of broadcasted programs, which is set by a user, is manually inputted to the key input unit when the password is needed, it is to be appreciated that the embodiment may be modified such that the controller 80 automatically generates a password when the user sets a watching restriction rating, alerts the user to know the password, and then automatically sets the password to the program to be recorded.

According to the method of recording broadcasted programs based on ratings, as described above, users may relatively easily and arbitrarily set watching ratings of the broadcasted programs when the broadcasted programs are recorded in various recording/reproducing apparatuses including a DVD recorder. Also, based on a detection of rating restriction signals of currently received broadcasted programs, when the detected rating is higher than a watching restriction rating set by the user, a password may be automatically set to a title of the broadcasted programs to be recorded, such that juveniles may be prevented from accessing adult programs, such as a pornography or violent movies, etc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recording a broadcasted program, comprising:
   setting a watching restriction rating of the broadcasted program according to user commands;
   detecting rating restriction information in a broadcasted signal, associated with the broadcasted program, received when the broadcasted program is recorded, and comparing the detected rating restriction information with the set watching restriction rating; and
   automatically setting a password to be associated with the recorded broadcasted program when the detected rate restriction information is higher than the set watching restriction rating,
   wherein the automatically setting the password occurs after starting a recording of the broadcast program and before completing the recording of the broadcast program.

2. The method as set forth in claim 1, further comprising inputting the password for the setting the watching restriction rating according to the user commands.

3. The method as set forth in claim 2, wherein the automatically setting of the password comprises setting the password that is inputted by the user commands.

4. The method as set forth in claim 1, wherein the automatically setting of the password comprises automatically generating and setting the password for the watching restriction rating set by the user.

5. The method as set forth in claim 1, wherein the automatically setting of the password automatically comprises associating the password with a title of the broadcasted program to be recorded such that the recorded broadcasted program cannot be accessed without an input of the password.

6. The method as set forth in claim 1, further comprising:
   recording the broadcasted program without requiring an input of the password when the detected rate restriction information is lower than the set watching restriction rating.

7. The method as set forth in claim 1, further comprising determining whether the password, which is inputted by the user as the password when reproducing the recorded broadcasted programs, is consistent with the set password, wherein, when the inputted password is consistent with the set password, the recorded broadcasted program is reproduced.

8. A method of recording a broadcasted program, comprising:
   setting a watching restriction rating of the broadcasted program according to first user commands;
   inputting a password for the set watching restriction rating according to second user commands;
   detecting rate restriction information in a broadcasted signal received when the broadcasted program is recorded, and comparing the detected rate restriction information with the set watching restriction rating; and
   automatically setting the password to be associated with a recorded broadcasted program when the detected rate restriction information is higher than the set watching restriction rating,
   wherein the automatically setting the password occurs after starting a recording of the broadcast program and before completing the recording of the broadcast program.

9. The method as set forth in claim 8, wherein the automatic setting of the password automatically sets the password inputted by the user to be associated with a title of the recorded broadcasted program such that the recorded broadcasted program cannot be accessed without an input of the password.

10. The method as set forth in claim 8, further comprising reproducing a recording of the broadcasted program without requiring an input of the password when the detected rate restriction information is lower than the set watching restriction rating.

11. A method of recording a broadcasted program, comprising:
   receiving an input to set a first restriction rating from among a range of ratings describing increasingly desired levels of program restrictiveness from low ratings to high ratings;

recording the broadcasted program and detecting a second restriction rating in a signal associated with the recorded broadcasted program;

comparing the detected second restriction rating with the first restriction rating; and restricting a reproduction of the recorded broadcasted program when the detected second restriction rating is higher than the first restriction rating by automatically setting a password associated with the recorded broadcasted program, wherein the automatically setting the password occurs after starting the recording of the broadcasted program and before completing the recording of the broadcast program.

12. The method according to claim 11, wherein the receiving comprises providing a user with a displayed menu and an input unit through which the user inputs the desired level of program restrictiveness.

13. The method according to claim 11, wherein the restricting comprises preventing a reproduction of the recorded broadcasted program until the password associated with the recorded broadcasted program is inputted.

14. The method according to claim 13, wherein the password is inputted by a user.

15. The method according to claim 13, wherein the password is plural in number, each being inputted by a user to correspond with each desired level of program restrictiveness.

16. The method according to claim 15, wherein the first restriction rating activates the corresponding password.

17. A recording/reproducing apparatus comprising a controller to receive an input to set a first restriction rating from among a range of ratings describing increasingly desired levels of program restrictiveness from low ratings to high ratings, to record a broadcasted program and to detect a second restriction rating in a signal associated with the recorded broadcasted program, to compare the detected second restriction rating with the first restriction rating, and to restrict a reproduction of the recorded broadcasted program when the detected second restriction rating is higher than the first restriction rating by automatically setting a password associated with the recorded broadcasted program, wherein the controller automatically sets the password occurs after starting a recording of the broadcasted program and before completing the recording of the broadcasted program.

18. The apparatus according to claim 17, wherein the apparatus records/reproduces data associated with the broadcasted program to/from DVDs, Hard Discs, and/or memory cards.

19. The apparatus according to claim 17, wherein the broadcasted program is received from a transmission of a broadcasted signal.

20. The apparatus according to claim 19, further comprising: a tuner to receive the broadcasted signal;

a video decoder to detect the second restriction rating from the signal;

a audio/visual (AN) codec to compress and code the signal and to generate and AN signal; and a recording medium, including at least one of a Hard Disc, a memory card, and/or a disc loader, to record the AN signal.

21. The apparatus according to claim 17, further comprising a key input unit to allow a user to generate the input to set the first restriction rating.

22. The apparatus according to claim 21, wherein the key input comprises a remote controller and/or keys installed in the apparatus.

23. The method of claim 6, wherein recording the broadcasted program comprises recording the broadcasted program on a recording medium.

24. The method of claim 8, further comprising recording the broadcasted program on a recording medium.

25. The method of claim 11, wherein recording the broadcasted program comprises recording the broadcasted program on a recording medium.

26. The method of claim 17, wherein recorded broadcasted program is recorded on a recording medium.

27. The method of claim 1, further comprising automatically generating a password and displaying the generated password to a user before the automatically setting the password.

28. The method of claim 8, further comprising automatically generating a password and displaying the generated password to a user before the automatically setting the password.

29. The method of claim 11, further comprising automatically generating a password and displaying the generated password to a user before the automatically setting the password.

30. The recording/reproducing apparatus of claim 17, wherein the controller automatically generates a password and displays the generated password to a user before the automatically setting the password.

* * * * *